May 6, 1958  G. BALDELLI  2,833,311
METERING DEVICE FOR LIQUIDS OR SOLUTIONS
Filed May 17, 1955
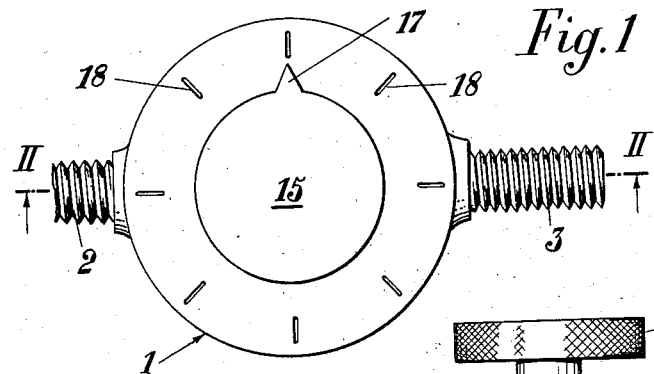
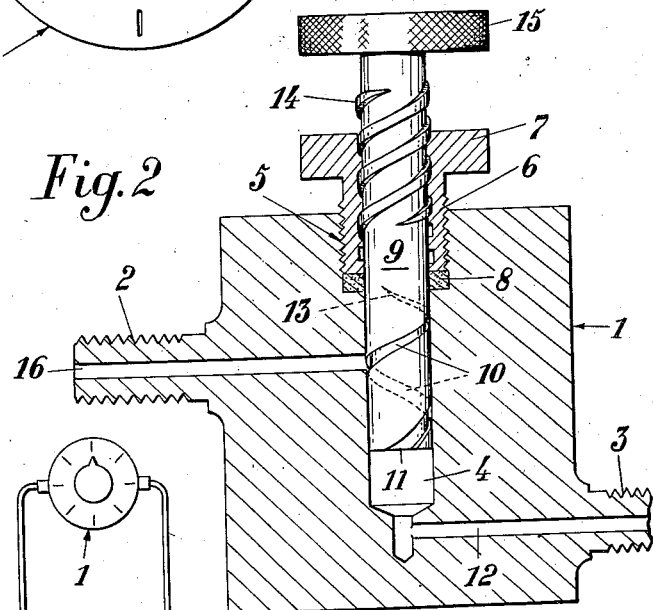
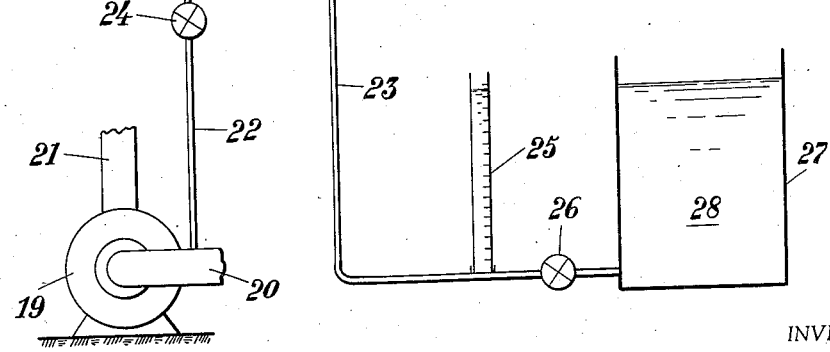
INVENTOR
GAETANO BALDELLI
BY Wenderoth, Lind & Ponack
ATTORNEYS

United States Patent Office 2,833,311
Patented May 6, 1958

2,833,311

METERING DEVICE FOR LIQUIDS OR SOLUTIONS

Gaetano Baldelli, Rome, Italy

Application May 17, 1955, Serial No. 509,008

Claims priority, application Italy June 28, 1954

3 Claims. (Cl. 138—43)

The present invention relates to an improvement in metering devices for either liquids or solutions, particularly suitable for the plants for rendering drinkable the water; however said device can be suitably used also in those plants where a careful metering of any liquid is necessary.

It is known that presently the adjustment of the metering devices for liquids is carried out by means of needle valves; another system for said adjustment may be that of varying the concentration of the solution or liquid passing through the metering device. These systems do not provide for an accurate, continuous and fine adjustment of the flow.

The purpose of this invention is, on the contrary, that of providing for a device of the concerned kind, which is suitable for all of the needs, which can be easily and safely operated, which does not exhibit failures of operation and which can be inserted in any hydraulic circuit.

According to the present improvement, a metering device to be inserted in series in a circuit wherein flows the liquid or the solution to be metered between at least an inflow duct and an outflow duct, comprises at least a duct wherein the amount of flow is carefully determined, the cross-section of said duct having a continuously and gradually varying area, the last cited duct being constantly inserted between the first cited ducts and being movable so that, being the end of the variable duct having the greatest cross-sectional area continuously open to the outflow duct, it is possible to carry at will any point of said movable duct to register with the outlet of the inflow duct, so as to determine at will the quantity of liquid entering the movable duct in a time unit, according to the value of the cross-sectional area of the movable duct, at the point which is brought to register with the aforecited outlet.

In one preferred form of embodiment, said duct or channel is embodied with a helical shape on the lateral wall of a cylindrical spigot inserted within a bore, on one lateral wall of said bore opening the inflow duct, while the outflow duct starts from the bottom of said bore.

This invention will be better disclosed, in one preferred form of embodiment thereof, with reference to the drawings contained in the accompanying sheet, wherein:

Fig. 1 shows a front elevational view of the metering device;

Fig. 2 shows a cross-sectional view of the device of Fig. 1, taken along the line II—II, and Fig. 3 diagrammatically shows the arrangement of the hydraulic circuit, wherein the metering device is inserted.

With reference to the drawings, the metering device is formed by a block 1, for instance having a cylindrical shape, to which lead, or to which are applied in any way suggested by the art, the two fittings 2 and 3, for the inflow pipe for the liquid to be metered and for the outflow pipe of said liquid, respectively. This way the liquid follows, inside the device, as it will be hereinafter described, the path from the fitting 2 towards the fitting 3. Inside the block 1 is provided a bore 4, the shape of which is substantially cylindrical; the duct coming from the fitting 2 opens in the lateral wall of the bore 4, while the duct leading to the fitting 3 starts from the bottom of said bore 4. This bore in its zone, remote from the fitting 3 has a greater diameter and is provided with an inner threading 5, wherein the bushing 6 can be screwed; said bushing is provided with an outer ring 7 forming a gland for a packing 8.

Within the bushing 6 is inserted a cylindrical element 9 which can both revolute and axially displace, in a sealing relationship within the bore 4. On the lateral wall of the cylindrical member 9 is provided the channel 10 helically shaped, the greatest cross-sectional area 11 is found at the end of the member 9 which is nearer to the outflow duct 12, said cross-sectional area gradually diminishing along its helical path until it is practically annulled at 13.

That portion of the member 9 whereon there is not the channel 10, is provided with a helical threading 14 fit in a corresponding threading provided on the inner surface of the bushing 6.

Said threading must have the same pitch of the helix forming the channel 10 and it is therefore clear as, when the member 9 is revoluted by its upper handle 15, the screwing of the threading 14 into the bushing 6 inserts through a greater or minor extent the member 9 within the bore 4, but, as the pitch of the threading equals that of the channel, if said channel was, when the operation has been started, in register with the inflow duct 16, the displacement of the member 9 always keeps a point of the channel in register with said duct, but as the cross-sectional area of the channel continuous varies, the greater or lesser amount of insertion of the member 9 within the bore 4 determines the value of the cross-sectional area of the channel in register with the duct 16 and therefore the quantity of liquid which, for each time unit, is admitted within the channel 10 and flows then through the continuously increasing portion of said channel, the bore 4 and the outflow duct 12.

It is to be noted that, in order to improve the mechanical operation of the unit, the screw 14, inserted into the bushing 6, is a double threaded screw. This needs a precise adjustment when the device is first operated as in the two positions corresponding to a given insertion of the member 9 into the bore 4 only one position is apt to bring the channel 10 in register with the duct 16 and is therefore operative. As aforesaid the bushing 6 acts on the packing 8 for the tightness; said packing surrounds a smooth portion of the member 9, between that part whereon the channel is provided and the part whereon the threading is provided.

In order to allow the device to be adjusted, in one preferred form of embodiment, the handle 15 for operating the member 9 is provided with a pointer 17 which can be brought to register with a scale 18 provided on the corresponding surface of the block 1.

Fig. 3 shows, by way of example, the insertion of this metering device in a circuit for rendering drinkable the water. Said circuit comprises a pump 19 provided with a suction duct 20 and with a delivery duct 21. On the suction duct 20 is branched a tube 22 in which the device is inserted, this metering device being shown, also in this case, at 1. The tube 22 is the outflow duct for the solution dosed by the device 1 and is provided with a check valve 24 which starts to operate when the pump 19 is stopped; the inflow duct is provided by the tube 23 having a level 25 for metering the rate of flow, and a cut-off gate 26; the inflow duct is connected with the tank 27 containing the sterilizing solution 28 to be mixed, in a metered quantity, to the water, and therefore to be admitted in the suction duct 20 of the pump; obviously, the unit is operated by the suction produced by the pump.

The level 25, which serves for checking the operation of the metering device 1 is caused to operate by closing the gate and by measuring the suction through the metering device 1.

It is to be noted that the outflow through the metering device according to the present improvement is a laminar improvement and therefore no loss of load occurs, as it occurs, on the contrary by the metering devices provided with needle valves which produce an outflow having a whirling movement.

I claim:

1. A liquid flow controlling device comprising a casing having an axial cylindrical cavity therein open at one end and closed at the opposite end, a liquid inlet duct opening into said cavity through the wall of said casing, a liquid outlet duct in the wall of said casing and communicating with said cavity near the bottom thereof, said cavity having a portion of enlarged diameter at the open end thereof, a bushing threaded into the said portion of enlarged diameter, said bushing having a threaded axial bore, a cylindrical valve stem in the bore of said bushing and in the said cavity, the portion of the valve stem in said cavity fitting tightly therein, the portion of said valve stem in the axial bore of said bushing having a thread fitting in the thread of the axial bore of the bushing, the portion of said valve stem in said cavity having a helicoidal groove on the surface thereof, said helicoidal groove having a cross section increasing in the direction of the flow, the pitch of said groove being equal to the pitch of said thread on said valve stem, said valve stem further having a smooth portion on the surface thereof between said threaded portion and the portion having the said helicoidal groove therein, and means to screw said threaded portion of the stem in the threaded bore of said bushing and to slide said valve stem axially, said helicoidal groove being positioned on the valve stem in such a manner to register with the said inlet duct opening into said cavity.

2. A liquid flow controlling device comprising a casing having an axial cylindrical cavity therein open at one end and closed at the opposite end, a liquid inlet duct opening into said cavity through the wall of said casing, a liquid outlet duct in the wall of said casing and communicating with said cavity near the bottom thereof, said cavity having a portion of enlarged diameter at the open end thereof, a bushing threaded into the said portion of enlarged diameter, said bushing having a threaded axial bore, a cylindrical valve stem in the bore of said bushing and in the said cavity, the portion of the valve stem in said cavity fitting tightly therein, the portion of said valve stem in the axial bore of said bushing having a thread fitting in the thread of the axial bore of the bushing, the portion of said valve stem in said cavity having a helicoidal groove on the surface thereof, said helicoidal groove having a cross section increasing in the direction of the flow, the pitch of said groove being equal to the pitch of said thread on said valve stem, said valve stem further having a smooth portion on the surface thereof between said threaded portion and the portion having the said helicoidal groove therein, a packing mounted on said smooth portion of said valve stem in the enlarged diameter of said cavity and compressed by said bushing, said helicoidal groove having a cross section increasing from a zero valve adjacent said smooth portion of the valve stem to a maximum value at the end of said valve stem adjacent the bottom of said cavity, and means to screw said threaded portion of the stem in the threaded bore of said bushing and to slide said valve stem axially, said helicoidal groove being positioned on the valve stem in such a manner to register with the said inlet duct opening into said cavity.

3. A liquid flow controlling device comprising a casing having an axial cavity therein, a liquid inlet duct for said cavity and a liquid outlet duct from said cavity, a valve stem fitted tightly in said cavity and having an upper threaded portion axially movable in said cavity and having a helicoidal groove on the lower surface thereof opposed to said liquid inlet duct, said groove having a cross section increasing in the direction of the flow, said groove being in communication with said outlet duct, thread means on said casing spaced from said groove and cooperable with the threaded portion of said valve stem, the threaded portion of said stem having a pitch equal to the pitch of said helicoidal groove, whereby the helicoidal groove registers with said inlet duct during the axial movement of said stem.

References Cited in the file of this patent

UNITED STATES PATENTS

| 122,427 | Barnett et al. | Jan. 2, 1872 |
| 2,312,834 | Hahn | Mar. 2, 1943 |
| 2,447,920 | Terry | Aug. 24, 1948 |